March 27, 1934. C. W. AKERS Re. 19,124

FLOOR CONSTRUCTION ELEMENT

Original Filed June 30, 1930 2 Sheets-Sheet 1

Charles Wm. Akers.
INVENTOR

BY Victor J. Evans
ATTORNEY

WITNESS: George L. Ogle.

March 27, 1934. C. W. AKERS Re. 19,124

FLOOR CONSTRUCTION ELEMENT

Original Filed June 30, 1930 2 Sheets-Sheet 2

Charles Wm. Akers.
INVENTOR

BY Victor J. Evans
ATTORNEY

WITNESS: George L. Ogle.

Reissued Mar. 27, 1934

Re. 19,124

UNITED STATES PATENT OFFICE 19,124

FLOOR CONSTRUCTION ELEMENT

Charles William Akers, Nashville, Tenn.

Original No. 1,828,237, dated October 20, 1931, Serial No. 464,989, June 30, 1930. Application for reissue June 2, 1933, Serial No. 674,730

4 Claims. (Cl. 72—66)

This invention relates to an improved construction of building units for partition or floor structures, and especially to units such as tiles, used in concrete floor constructions.

The general object of the invention is to provide means for strengthening a floor formed of concrete and to facilitate the construction of the floor.

Another object of the invention is to provide means on the unit whereby flooring and the like can be nailed to the units.

A still further object is to provide means on the tiles or other units which will facilitate the leveling of the concrete, said means on the tiles or units forming guides or screeds for the leveling instrument used in the leveling of the materials of which the floor is formed.

The invention also consists in certain other features of construction and in the combination and arrangements of the several parts, all as will hereinafter be more fully described and the novel features particularly pointed out in the appended claims.

In describing the invention in detail, reference will be had to the accompanying drawings, wherein like characters denote like or corresponding parts throughout the several views.

In the accompanying drawings.

Figure 1:
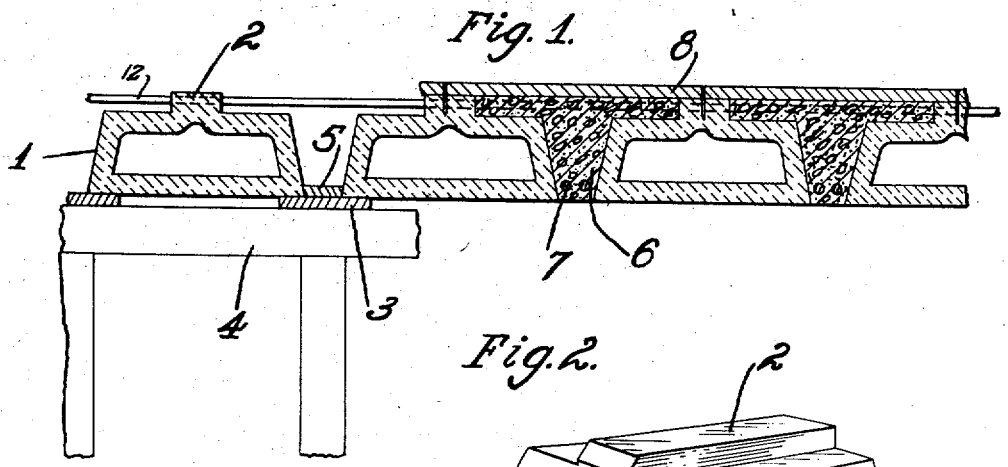
Figure 1 is a sectional view illustrating how the units, in this instance tiles, used in floor construction, are utilized in the construction of a concrete floor.
Figure 2:
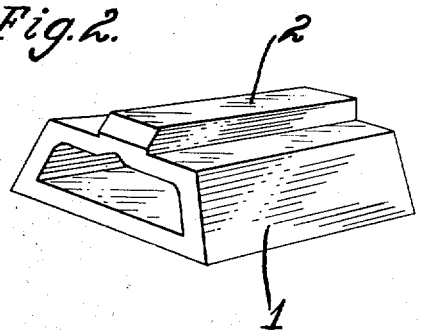
Fig. 2 is a view of one of the tiles shown in use in Fig. 1.

In that form of the invention shown in Figs. 1 and 2, the unit 1, which is an element referred to as a tile, and which is adapted for use in concrete floor construction, is formed with a flat bottom, tapered side edges and a flat top, which is formed with longitudinal rib 2. This tile unit is preferably formed of fire-proof material, and is of such a nature that a nail or the like can be driven into the same. In use, the tile units are set on the strips 3 supported by the frame 4, the strips 3 forming portions of the floor mold, and in order to evenly space the tile units apart in the rows, spacer strips 5 are placed on the strips 3, against each row of tile units as the latter are laid, so that the next succeeding row of tile units can be placed against the strip 5, as shown in Fig. 1. After thus placing the successive rows of tile units, the strips 5 are removed and concrete 6 poured in the form, entering the spaces between the rows of tile units, reinforcing rods 7 having first been placed in said spaces. The ribs 2 extending longitudinally of the tile units, form guides or screeds for the leveling board or other instrument which is used to level the concrete after the same has been poured in place. When the concrete hardens, the concrete and the tile units form a floor or horizontal partition. When a floor 8 of wood or the like is to be laid on the concrete floor, this flooring material can be nailed to the ribs 2 on which it rests, as shown in Fig. 1.

Figure 3:
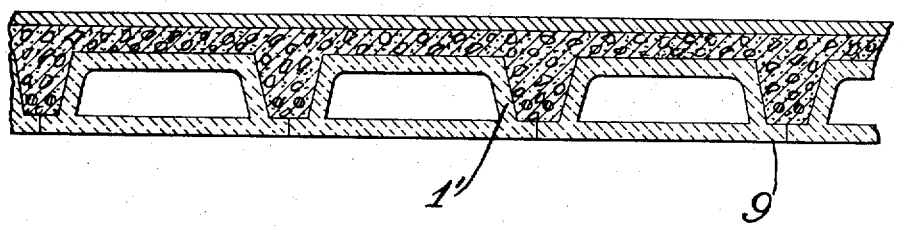
Fig. 3 is a sectional view of a floor, showing the use of a modified form of unit, or tile.
Figure 4:
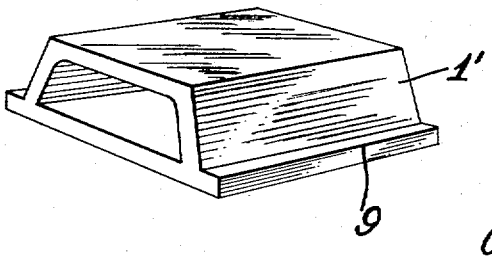
Fig. 4 is a view of one of the units shown in Fig. 3.

Figs. 3 and 4 show a tile unit 1′ formed without the rib 2. This tile unit is formed with flanges 9, however, at the lower parts of its sides, the flanges on one unit abutting those of another, as shown in Fig. 3, so that these units are self-spacing and the use of the spacer strips 5 is rendered unnecessary. With the use of the tile units shown in Figs. 3 and 4, the entire ceiling is formed by the base parts of the units, as none of the concrete forms such ceiling, as it does in the construction illustrated in Fig. 1.

Figure 5:
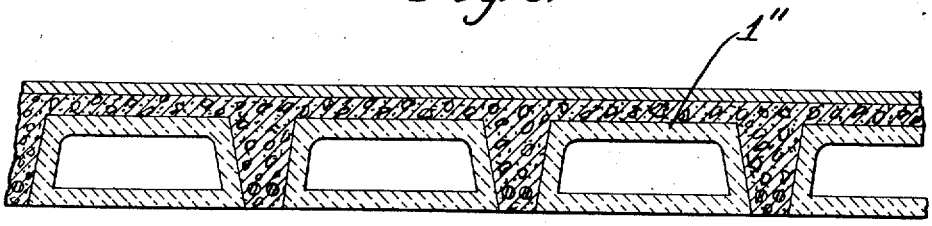
Fig. 5 is a view similar to Fig. 3, but illustrating the use of a still further modified form of unit.
Figure 6:
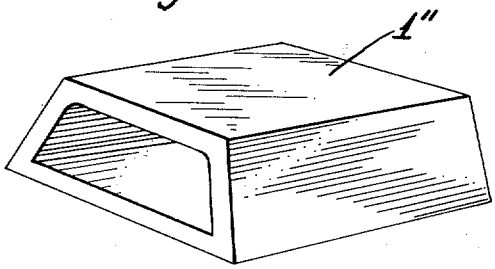
Fig. 6 is a view of the unit shown in Fig. 5.

Figs. 5 and 6 show the same form of tile unit 1″, as shown in Figs. 2 and 4, with the exception that the flanges are omitted, so that these units are separated the same as the units shown in Figs. 1 and 2.

Figure 7:
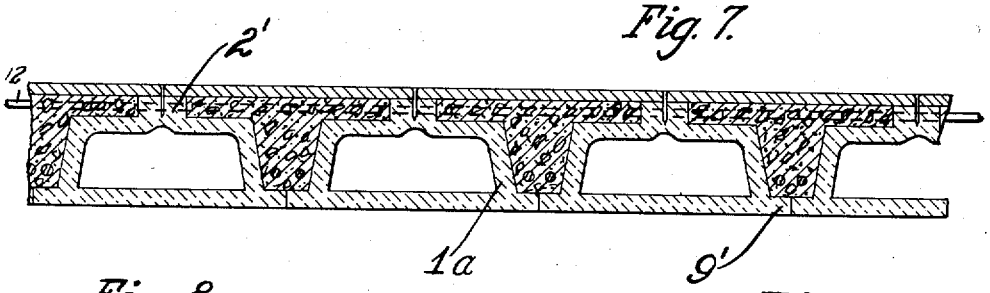
Fig. 7 is a view similar to Fig. 5, but showing the use of another form of unit.
Figure 8:
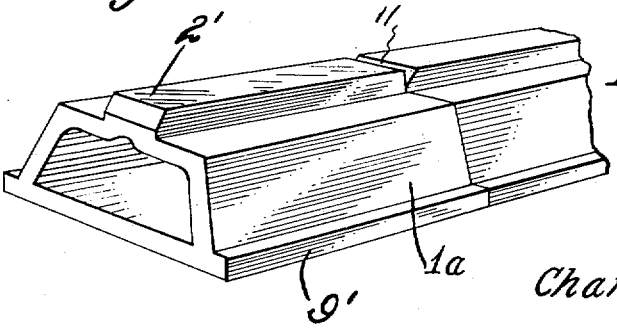
Fig. 8 is a view of one of the units illustrated in Fig. 7.

Figs. 7 and 8 show a tile unit 1*a*, provided with both the rib 2′ and the flanges 9′. Such a unit combines the features of the units shown in Figs. 1 and 2, and 3 and 4.

Figure 9:
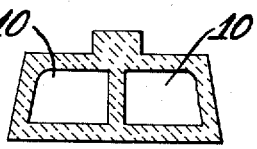
Fig. 9 is a sectional view through a tile provided with two cores.

Fig. 9 shows how the tile unit may be formed with two cores 10, instead of a single core, as in the other figures. Of course, the tile units can be formed of any internal shape, as desired. Likewise, the units may take various external shapes and be of various cross-sectional outlines. Furthermore, the use of the rib 2 is not limited to the exact forms of units illustrated, nor to use on hollow tiles. In other words, the rib is readily adapted for use on other partition or floor units.

The improved form of unit or tile facilitates the laying of concrete floors as the units form portions of the form for receiving the concrete and a solid bottom for a form is not necessary, as it is simply necessary to provide means for supporting the units and, when the latter are spaced apart, as in Fig. 1, the members 3 are simply used to close the bottom of the spaces between the rows of units. When units having the ribs 2 thereon are used, the ribs form guiding means for the leveling board or other leveling instrument. Said ribs also serve as supports for flooring material or the like, which may be nailed to said ribs. The exposed base portions of the units or tiles can also have ceiling forming means, or any other means attached thereto by nails or the like. The units, whether they be tiles, or other floor construction elements, may be formed of cinder concrete or any other suitable material, which will permit nails or the like to be driven into them. The ceiling formed by the flanged tile units, shown in Figs. 6 and 7, can be painted, plastered or otherwise treated, or the ceiling forming metal, boards or the like, may be fastened to the units.

One end of the rib of each tile unit may be beveled, as shown at 11, these beveled parts forming spaces for reinforcing rods or bars 12, placed adjacent the surface of the concrete and which act to prevent surface cracks. In forming this recess 11 in the rib, whether it be at the end thereof, or not, the recess should be of such form as to support said reinforcing rods or bars in spaced relation with respect to the top face of the tile unit and in proximity to the surface of the floor formed by the concrete. In other words, the recess should not extend to the top face of the tile unit, or, if it does extend to said face, its sides should converge downwardly, so that the distance between the sides, at their lower portions will be less than the cross-sectional dimension of the reinforcing bar or rod, whereby said rod will be supported in spaced relation with respect to said top face. The depth of the recess, or the convergence of the side walls of the recess, will, therefore, depend on the height of the rib, it only being essential that the reinforcing rods or bars be spaced from the top face of the unit and adjacent the surface of the concrete, as just mentioned. It will be apparent that this placement of reinforcing bars or rods 12 will retain them in proper spaced position with respect to each other, during the pouring of the concrete. It will also be apparent that this placement and positioning of the reinforcing bars or rods is not limited to unit structures of the specific type illustrated in the accompanying drawings, but the same results may be obtained where floor units of other forms are used, so long as said units are provided with recessed ribs, as just described.

It is believed from the foregoing description that the novel features of the invention will be readily apparent. It is to be understood that changes may be made in the construction and in the combination and arrangement of the several parts, provided that such changes fall within the scope of the appended claims.

What I claim is:

1. A structural unit for a concrete floor structure having an integral elongated centrally arranged rib extending longitudinally of the top surface of said unit, throughout the major portions of the length thereof, said rib being formed of nailable material and adapted to project through the floor structure, one end of the rib being reduced to form a space for a reinforcing bar.

2. A structural unit for concrete floor construction having an elongated rib of nailable material extending substantially entirely across one face thereof, a portion of said rib being removed to form a transverse depression therein for the placement of a reinforce element.

3. A structural unit for concrete floor construction having a rib across one face thereof, a portion of said rib being removed to form a transverse depression for the placement of a reinforce element, the depth of said depression being less than the height of the rib to position the reinforce element adjacent the top surface of said rib.

4. A structural unit for concrete floor construction having a rib extending across one face thereof adapted to project through a body of concrete placed over said face, and means for positioning a reinforce element extending transversely of said rib in spaced relation with respect to both the projecting surface of said rib and the said top face of said unit.

CHARLES WILLIAM AKERS.